US010424079B2

United States Patent
Viswanathan

(10) Patent No.: US 10,424,079 B2
(45) Date of Patent: Sep. 24, 2019

(54) UNSUPERVISED APPROACH TO ENVIRONMENT MAPPING AT NIGHT USING MONOCULAR VISION

(71) Applicant: HERE GLOBAL B.V., Eindhoven (NL)

(72) Inventor: Anirudh Viswanathan, Berkeley, CA (US)

(73) Assignee: HERE GLOBAL B.V., Eindhoven (NL)

(*) Notice: Subject to any disclaimer, the term of this patent is extended or adjusted under 35 U.S.C. 154(b) by 286 days.

(21) Appl. No.: 15/479,617

(22) Filed: Apr. 5, 2017

(65) Prior Publication Data

US 2018/0293453 A1  Oct. 11, 2018

(51) Int. Cl.
- *G06K 9/46* (2006.01)
- *G06T 7/73* (2017.01)
- *G06K 9/00* (2006.01)
- *G06K 9/62* (2006.01)

(52) U.S. Cl.
CPC ............ *G06T 7/73* (2017.01); *G06K 9/00791* (2013.01); *G06K 9/46* (2013.01); *G06K 9/627* (2013.01); *G06K 9/6256* (2013.01); *G06T 2207/20084* (2013.01)

(58) Field of Classification Search
CPC .......................... G06T 7/73; G06T 2207/20084; 06K 9/627; G06K 9/6256; G06K 9/00791; G06K 9/46
See application file for complete search history.

(56) References Cited

U.S. PATENT DOCUMENTS

| 7,912,633 B1* | 3/2011 | Dietsch ................. G01C 21/20 701/450 |
| 9,940,729 B1* | 4/2018 | Kwant ...................... G06T 7/73 |
| 2013/0073114 A1* | 3/2013 | Nemat-Nasser ...... B60W 40/09 701/1 |

(Continued)

FOREIGN PATENT DOCUMENTS

WO    WO 2016/130719 A2    8/2016

OTHER PUBLICATIONS

Eigen, David, "Predicting Images Using Convolutional Networks: Visual Scene Understanding with Pixel Maps", Dissertation, New York University, May 2015, 149 pages, retrieved from <http://www.cs.nyu.edu/~deigen/deigen-thesis.pdf> on Aug. 3, 2017.

(Continued)

*Primary Examiner* — Carol Wang
(74) *Attorney, Agent, or Firm* — Alston & Bird LLP

(57) ABSTRACT

A trained feature network receives an image captured under low illumination conditions and pose data corresponding to the image. The trained feature network identifies a feature within the image and analyzes the image to extract feature information corresponding to the feature from the image. Based on the image and the pose data, geo-location information corresponding to the feature is determined. The geo-location information is appended to the extracted feature information. The feature information is stored as part of a feature map layer of a digital map. At least a portion of the digital map is provided to a routing and navigation system, for example, for performing vehicle localization under the particular condition.

20 Claims, 6 Drawing Sheets

(56) References Cited

U.S. PATENT DOCUMENTS

| | | | | |
|---|---|---|---|---|
| 2014/0350839 | A1* | 11/2014 | Pack | G01C 21/30 701/409 |
| 2016/0171311 | A1 | 6/2016 | Case et al. | |
| 2016/0272200 | A1 | 9/2016 | Prokhorov et al. | |
| 2016/0325680 | A1 | 11/2016 | Curtis et al. | |
| 2017/0083792 | A1* | 3/2017 | Rodriguez-Serrano | G06F 16/54 |
| 2017/0193338 | A1* | 7/2017 | Huberman | G05D 1/0088 |
| 2018/0039867 | A1* | 2/2018 | Cheng | G06K 9/00536 |
| 2018/0237000 | A1* | 8/2018 | Litkouhi | B60W 10/04 |
| 2019/0019062 | A1* | 1/2019 | Fukui | G01C 21/32 |

OTHER PUBLICATIONS

Limmer, Matthias, et al., "Robust Deep-Learning-Based Road-Prediction for Augmented Reality Navigation Systems", IEEE 19th International Conference on Intelligent Transportation Systems, Nov. 1-4, 2016, Brazil, pp. 1888-1895, retrieved from <https://arxiv.org/pdf/1605.09533.pdf> on Aug. 3, 2017.

Linegar, Chris, et al., "Made to Measure: Bespoke Landmarks for 24-Hour, All-Weather Localisation with a Camera", IEEE International Conference on Robotics and Automation (ICRA), May 16-21, 2016, Sweden, 8 pages, IEEE, retrieved from <http://www.robots.ox.ac.uk/~mobile/Papers/2016ICRA_Linegar.pdf> on Aug. 3, 2017.

Nelson, Peter, et al., From Dusk till Dawn: Localisation at Night using Artificial Light Sources, IEEE International Conference on Robotics and Automation (ICRA), May 26-20, 2015, USA, 8 pages, IEEE, retrieved from <http://www.robots.ox.ac.uk/~mobile/Papers/2015ICRA_Nelson.pdf> on Aug. 3, 2017.

U.S. Appl. No. 15/375,513, "Pose Error Estimation and Localization Using Static Features", Unpublished (filed Dec. 12, 2016), (Richard Kwant, Inventor), (Here Global B.V., assignee).

Xie, Michael, et al., "Transfer Learning From Deep Features for Remote Sensing and Poverty Mapping", 30th AAAI Conference on Artificial Intelligence, Feb. 12-17, 2016, pp. 3929-3935, USA, retrieved from <https://arxiv.org/pdf/1510.00098.pdf> on Aug. 3, 2017.

* cited by examiner

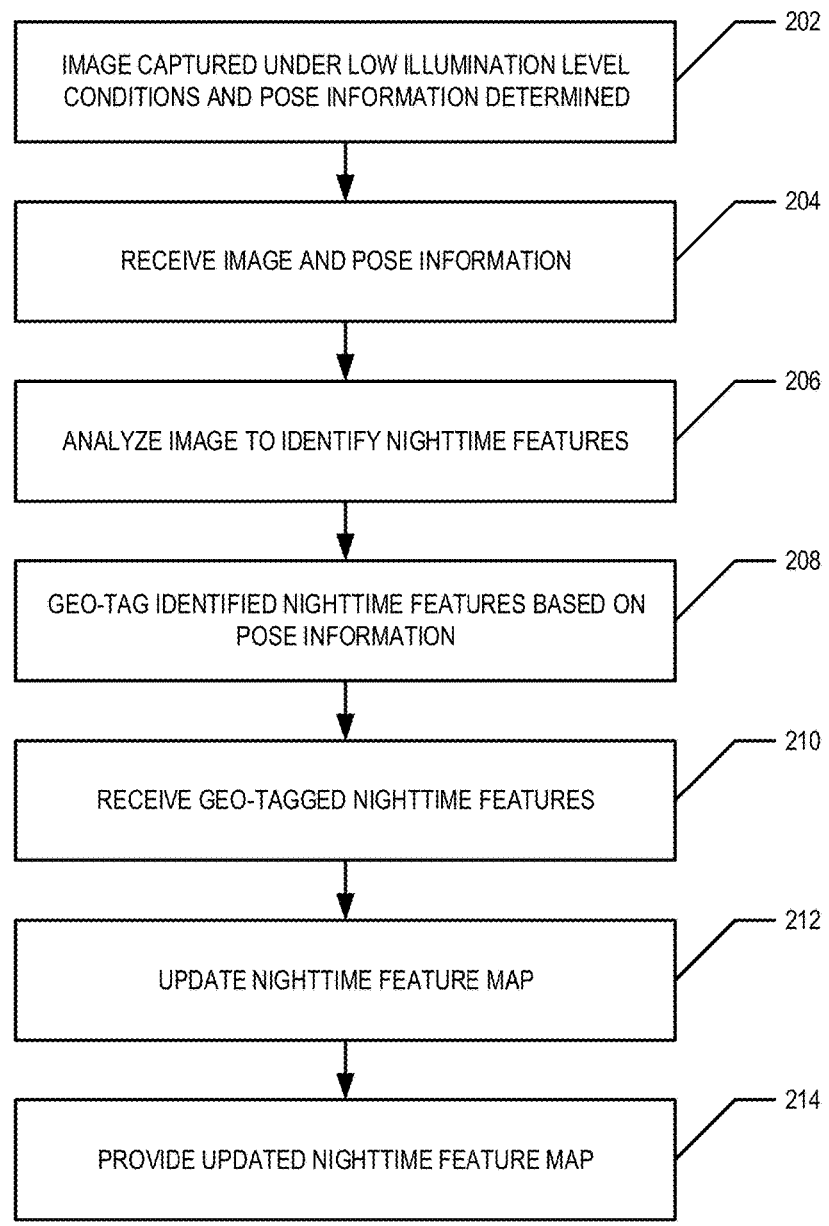

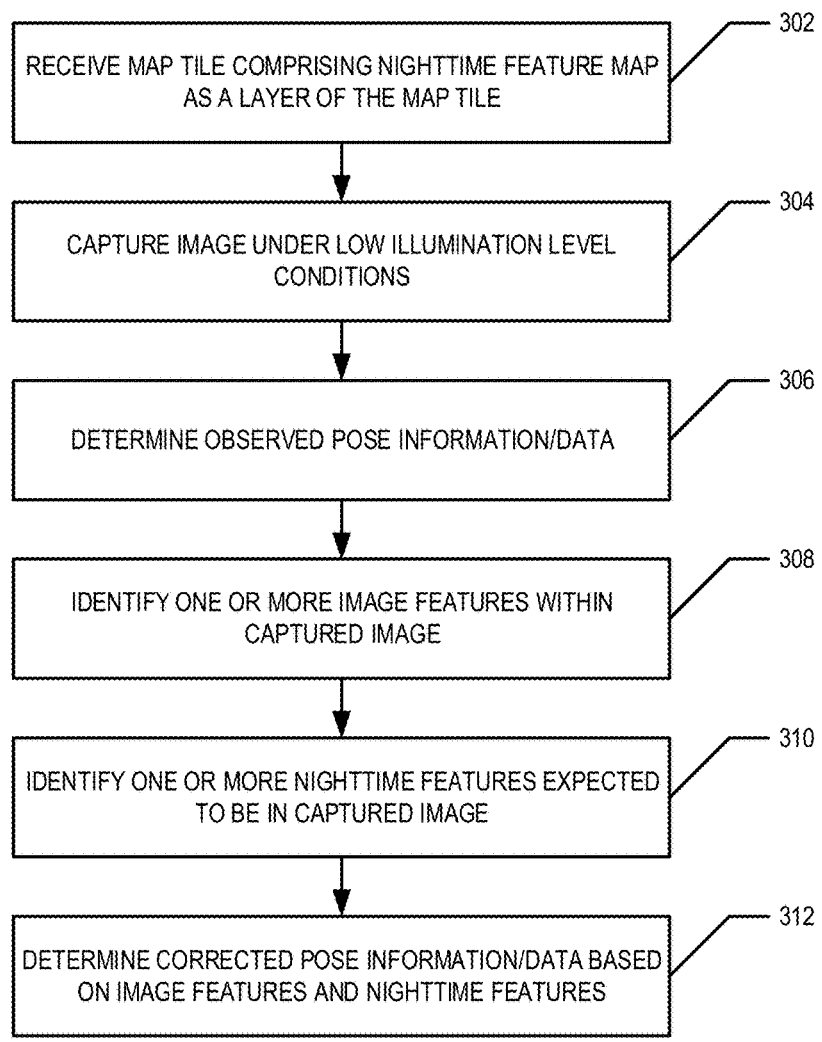

UNSUPERVISED APPROACH TO ENVIRONMENT MAPPING AT NIGHT USING MONOCULAR VISION

TECHNOLOGICAL FIELD

An example embodiment relates generally to optical and/or image-based mapping and localization. In particular, an example embodiment generally relates to using optical and/or image-based vehicle localization techniques under low illumination conditions as related to map construction.

BACKGROUND

Autonomous driving requires high accuracy, real-time localization of vehicles. Currently, most vehicle navigation has been accomplished using a global positioning system (GPS), which provides a real-time location with a 95% confidence interval of 7.8 meters, according to the US government. However, in complicated urban environments, reflection in GPS signals can further increase this error, such that a determined location may be off by as much as 30 meters. Given that the width of many lanes is only 3 to 4 meters, this accuracy is not sufficient to properly localize an autonomous vehicle so that it can make appropriate route planning decisions. Other sensors, such as inertial measurement units (IMUs) can increase the accuracy of localization by taking into account vehicle movement, but these sensors tend to drift and still do not provide sufficient accuracy for localization. In general, the industry recognizes that a localization accuracy of around 10 cm is desired for autonomous driving in many areas. Thus, optical and/or image-based techniques for vehicle localization may be used to localize the vehicle to the desired accuracy level. However, optical and/or image-based techniques for vehicle localization generally require conditions with sufficient ambient illumination levels. For example, the set of features that are visible during the daytime may be different from the features that are visible during the nighttime.

BRIEF SUMMARY

An example embodiment provides a nighttime feature network for identifying nighttime features in images captured under low illumination level conditions. In an example embodiment, the trained nighttime feature network is a trained deep neural network. The nighttime feature network may then be used to build a nighttime feature library, database, repository, map, and/or the like. The static feature library, database, repository, or map may be stored as a layer of a digital map that may be used for vehicle localization and/or determination of pose information/data. In an example embodiment, pose information/data corresponding to a vehicle may comprise a location (e.g., latitude and longitude) and direction and/or heading describing the physical location and orientation of the vehicle. For example, nighttime feature information/data may be embedded within a map tile of a digital map. In particular, methods, apparatus, and computer program products are provided in accordance with an example embodiment in order to train a nighttime feature network, build a nighttime feature library, database, repository, or map to enable vehicle localization and/or pose determination under low illumination level conditions.

According to an example embodiment, a trained feature network receives an image captured under particular conditions and pose data corresponding to the image. The trained feature network identifies a feature within the image. The trained feature network analyzes the image to extract feature information corresponding to the feature from the image. Based on the image and the pose data, geo-location information corresponding to the feature is determined. The geo-location information is appended to the feature information. The feature information is stored as part of a feature map layer of a digital map. At least a portion of the digital map is provided to a routing and navigation system. In an example embodiment, the particular conditions comprise low illumination level conditions.

According to an example embodiment, a map provider system is provided. For example, the map provider system may be configured to provide a feature map for vehicle localization under particular conditions. The map provider system comprises at least one memory storing a digital map. The map provider system further comprises at least one communications interface configured to enable communication with one or more routing and navigation systems. The map provider system further comprises at least one processor configured to operate a trained feature network. The trained feature network is configured to receive an image captured under particular conditions and pose data corresponding to the image; identify a feature within the image; analyze the image to extract feature information corresponding to the feature from the image; determine, based on the image and the pose data, geo-location information corresponding to the feature; and append the geo-location information to the feature information. The at least one processor is further configured to store the feature information as part of a feature map layer of the digital map; and cause the at least one communications interface to provide at least a portion of the digital map to a routing and navigation system. The routing and navigation system is configured to (a) perform a localization determination based on the feature map layer of the portion of the digital map and (b) make a routing decision based on the localization determination.

In an example embodiment, the particular conditions comprise low illumination level conditions (e.g., nighttime). In an example embodiment, to train the feature network, the at least one processor is configured to cause a deep neural network to receive a sequence of training. The sequence of training images is captured under the particular conditions (e.g., at nighttime). The at least one processor causes the deep neural network to analyze a portion of the sequence of training images. The sequence of training images comprises a particular training image and the portion of the sequence of training images comprising two or more training images of the sequence of training images that are not the particular training image. The at least one processor is further configured to cause the deep neural network to identify one or more features based on the analysis of the portion of sequence of training images. The at least one processor is further configure dot cause the deep neural network to generate an encoded representation of the particular image determine a loss function based on an analysis of the particular image and the encoded representation of the particular image; and update a network weight of the feature network based at least in part on the loss function. In an example embodiment, the deep neural network is formatted as an auto-encoder representation. In an example embodiment, the sequence of training images is a temporal sequence and the particular image is a middle image of the temporal sequence. In an example embodiment, (a) a sequence of pose information is provided to the deep neural network, (b) each instance of the sequence of pose information corresponding to a training image of the sequence of training images, and (c) the one or more features are identified based at least in part on the motion indicated by the sequence of pose information.

According to an example embodiment, a method is provided. The method comprises receiving, by a trained feature network, an image captured under particular conditions and pose data corresponding to the image. The method further comprises identifying, by the trained feature network, a feature within the image; analyzing the image with the trained feature network to extract feature information corresponding to the feature from the image; and determining, based on the image and the pose data, geo-location information corresponding to the feature. The method further comprises appending the geo-location information to the feature information; storing the feature information as part of a feature map layer of a digital map; and providing at least a portion of the digital map to a routing and navigation system.

In an example embodiment, the routing and navigation system performs one or more localization determinations based on information stored in the feature map layer and at least one of (a) performs one or more route planning decisions, (b) operates a vehicle based on the one or more localization determinations, or (c) both. In an example embodiment, the particular conditions comprise low illumination level conditions (e.g., nighttime). In an example embodiment, training the feature network comprises receiving a sequence of training images by a deep neural network. The sequence of training images is captured under the particular conditions (e.g., at nighttime). Training the feature network further comprises analyzing, by the deep neural network, a portion of the sequence of training images. The sequence of training images comprises a particular training image and the portion of the sequence of training images comprises two or more training images of the sequence of training images that are not the particular training image. Training the feature network further comprises identifying, by the deep neural network, one or more features based on the analysis of the portion of sequence of training images; generating, by the deep neural network, an encoded representation of the particular image; determining a loss function based on an analysis of the particular image and the encoded representation of the particular image; and updating a network weight of the feature network based at least in part on the loss function. In an example embodiment, the deep neural network is formatted as an auto-encoder representation. In an example embodiment, the sequence of training images is a temporal sequence and the particular image is a middle image of the temporal sequence. In an example embodiment, (a) a sequence of pose information is provided to the deep neural network, (b) each instance of the sequence of pose information corresponding to a training image of the sequence of training images, and (c) the one or more features are identified based at least in part on the motion indicated by the sequence of pose information.

In accordance with an example embodiment, an apparatus is provided that comprises at least one processor and at least one memory storing computer program code with the at least one memory and the computer program code being configured to, with the processor, cause the apparatus to at least cause a trained feature network to receive an image captured under particular conditions and pose data corresponding to the image. The at least one memory and the computer program code are further configured to, with the processor, cause the apparatus to at least identify, by the trained feature network, a feature within the image; analyze the image with the trained feature network to extract feature information corresponding to the feature from the image; and determine, based on the image and the pose data, geo-location information corresponding to the feature. The at least one memory and the computer program code are further configured to, with the processor, cause the apparatus to at least append the geo-location information to the feature information; store the feature information as part of a feature map layer of a digital map; and provide at least a portion of the digital map to a routing and navigation system.

In an example embodiment, the routing and navigation system performs one or more localization determinations based on information stored in the feature map layer and at least one of (a) performs one or more route planning decisions, (b) operates a vehicle based on the one or more localization determinations, or (c) both. In an example embodiment, the particular conditions comprise low illumination level conditions (e.g., nighttime). In an example embodiment, training the feature network comprises receiving a sequence of training images by a deep neural network. The sequence of training images is captured under the particular conditions (e.g., at nighttime). Training the feature network further comprises analyzing, by the deep neural network, a portion of the sequence of training images. The sequence of training images comprises a particular training image and the portion of the sequence of training images comprises two or more training images of the sequence of training images that are not the particular training image. Training the feature network further comprises identifying, by the deep neural network, one or more features based on the analysis of the portion of sequence of training images; generating, by the deep neural network, an encoded representation of the particular image; determining a loss function based on an analysis of the particular image and the encoded representation of the particular image; and updating a network weight of the feature network based at least in part on the loss function. In an example embodiment, the deep neural network is formatted as an auto-encoder representation. In an example embodiment, the sequence of training images is a temporal sequence and the particular image is a middle image of the temporal sequence. In an example embodiment, (a) a sequence of pose information is provided to the deep neural network, (b) each instance of the sequence of pose information corresponding to a training image of the sequence of training images, and (c) the one or more features are identified based at least in part on the motion indicated by the sequence of pose information.

In accordance with an example embodiment, a computer program product is provided that comprises at least one non-transitory computer-readable storage medium having computer-executable program code instructions stored therein with the computer-executable program code instructions comprising program code instructions configured to cause a trained feature network to receive an image captured under particular conditions and pose data corresponding to the image. The computer-executable program code instructions further comprise program code instructions configured to identify, by the trained feature network, a feature within the image; analyze the image with the trained feature network to extract feature information corresponding to the feature from the image; and determine, based on the image and the pose data, geo-location information corresponding to the feature. The computer-executable program code instructions further comprise program code instructions configured to append the geo-location information to the feature information; store the feature information as part of a feature map layer of a digital map; and provide at least a portion of the digital map to a routing and navigation system.

In an example embodiment, the routing and navigation system performs one or more localization determinations based on information stored in the feature map layer and at least one of (a) performs one or more route planning decisions, (b) operates a vehicle based on the one or more localization determinations, or (c) both. In an example embodiment, the particular conditions comprise low illumination level conditions (e.g., nighttime). In an example embodiment, training the feature network comprises receiving a sequence of training images by a deep neural network. The sequence of training images is captured under the particular conditions (e.g., at nighttime). Training the feature network further comprises analyzing, by the deep neural network, a portion of the sequence of training images. The sequence of training images comprises a particular training image and the portion of the sequence of training images comprises two or more training images of the sequence of training images that are not the particular training image. Training the feature network further comprises identifying, by the deep neural network, one or more features based on the analysis of the portion of sequence of training images; generating, by the deep neural network, an encoded representation of the particular image; determining a loss function based on an analysis of the particular image and the encoded representation of the particular image; and updating a network weight of the feature network based at least in part on the loss function. In an example embodiment, the deep neural network is formatted as an auto-encoder representation. In an example embodiment, the sequence of training images is a temporal sequence and the particular image is a middle image of the temporal sequence. In an example embodiment, (a) a sequence of pose information is provided to the deep neural network, (b) each instance of the sequence of pose information corresponding to a training image of the sequence of training images, and (c) the one or more features are identified based at least in part on the motion indicated by the sequence of pose information.

In accordance with yet another example embodiment of the present invention, an apparatus is provided that comprises means for receiving, by a trained feature network, an image captured under particular conditions (e.g., low illumination level conditions such as at nighttime) and pose data corresponding to the image. The apparatus further comprises means for identifying, by the trained feature network, a feature within the image. The apparatus further comprises means for analyzing the image with the trained feature network to extract feature information corresponding to the feature from the image. The apparatus further comprises means for determining, based on the image and the pose data, geo-location information corresponding to the feature. The apparatus further comprises means for appending the geo-location information to the feature information. The apparatus further comprises means for storing the feature information as part of a feature map layer of a digital map. The apparatus further comprises means for providing at least a portion of the digital map to a routing and navigation system. In an example embodiment, the apparatus further comprises means for training a deep neural network as a feature network.

BRIEF DESCRIPTION OF THE DRAWINGS

Figure 1:
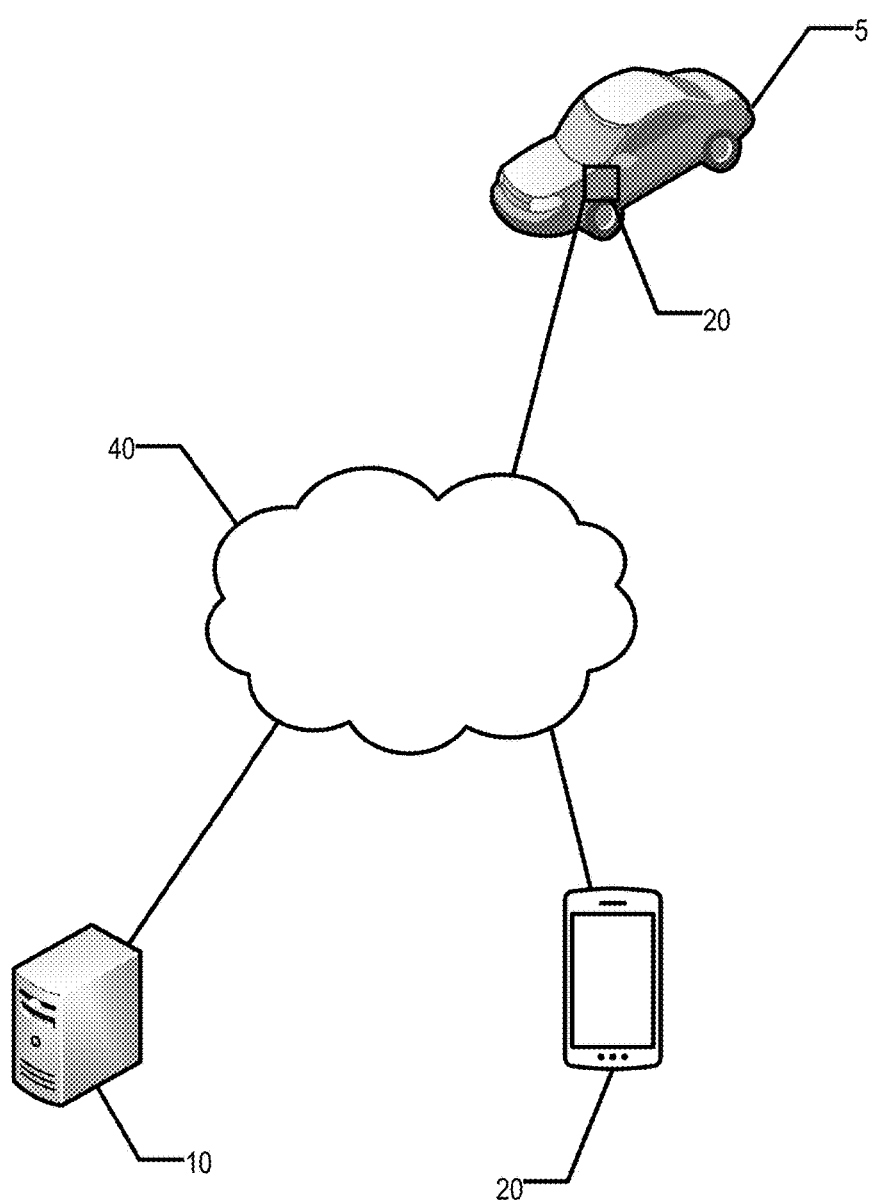
Figure 2A:
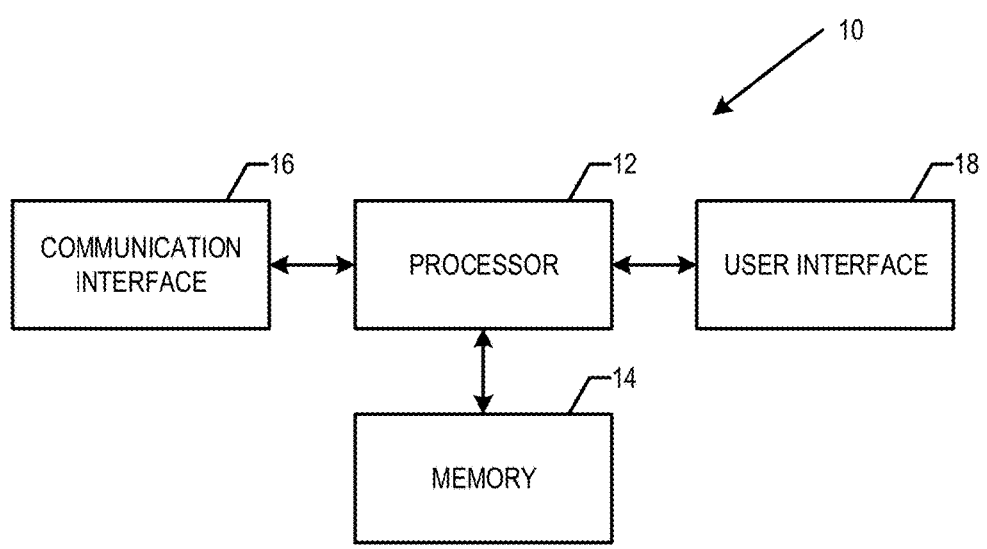
Figure 2B:
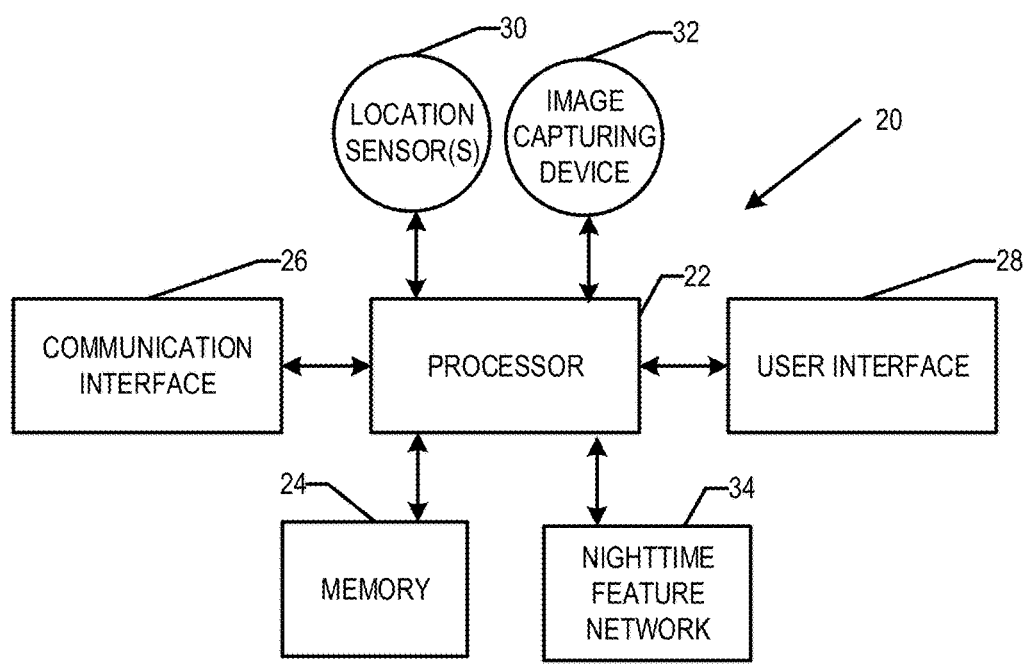
Figure 3:
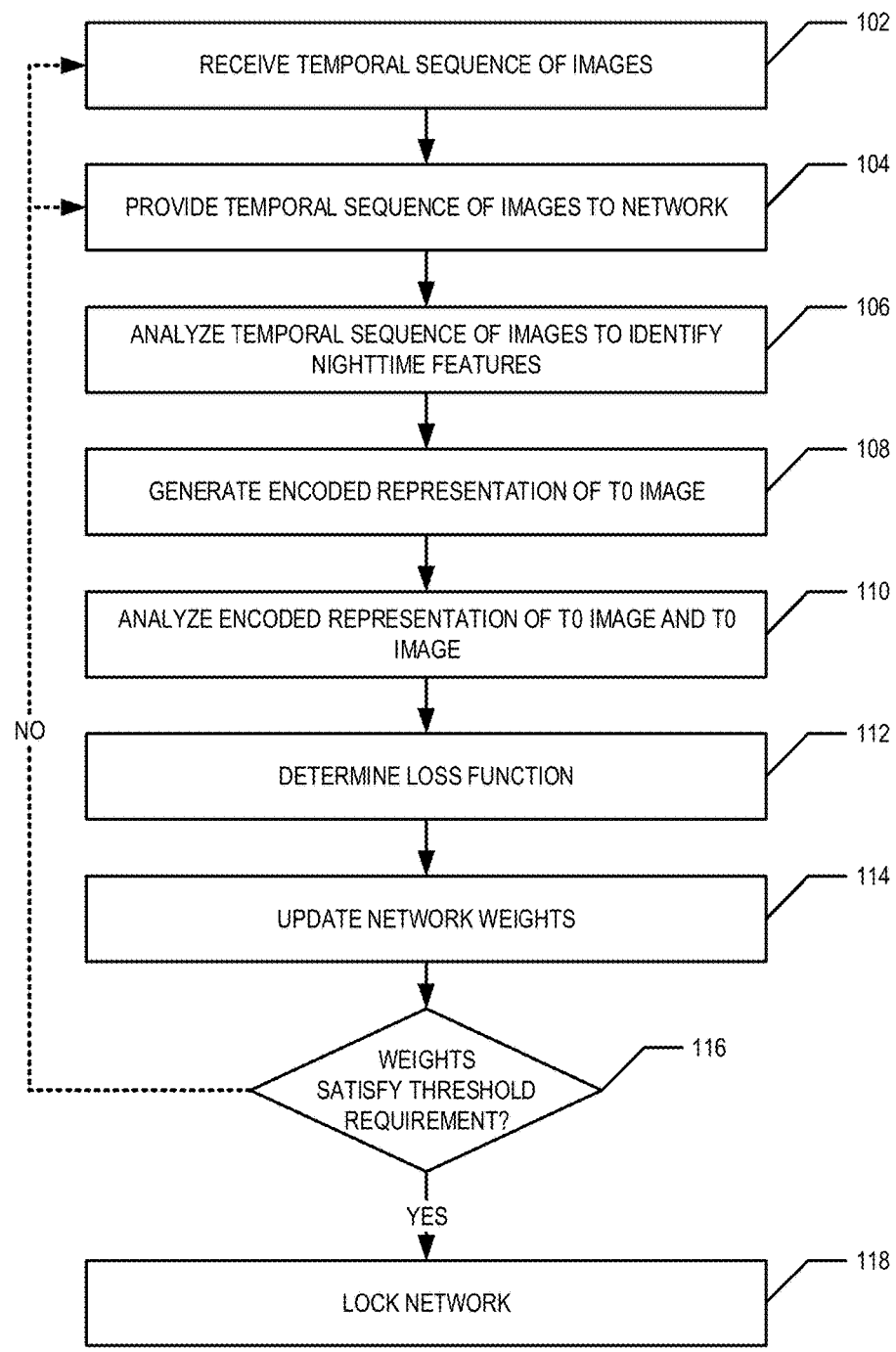

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a remote apparatus that may be specifically configured in accordance with an example embodiment;

FIG. 2B is a block diagram of a vehicle apparatus that may be specifically configured in accordance with an example embodiment;

FIG. 3 is a flowchart illustrating operations performed, such as by the remote apparatus of FIG. 2A and/or the vehicle apparatus of FIG. 2B to train the nighttime feature network, in accordance with an example embodiment;

FIG. 4 is a flowchart illustrating operations performed, such as by the remote apparatus of FIG. 2A and/or the vehicle apparatus of FIG. 2B, in accordance with an example embodiment.

FIG. 5 is a flowchart illustrating operations performed, such as by the remote apparatus of FIG. 2A and/or the vehicle apparatus of FIG. 2B, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment to perform optical and/or image-based localization of a vehicle under low illumination conditions (e.g., nighttime, heavy cloud cover, and/or the like). In an example embodiment, the optical and/or image-based localization may be performed in addition to use of a location sensor (e.g., GNSS sensors, GPS sensors, IMUs, and/or the like). In an example embodiment, a deep net and/or neural network is trained to identify generic invariant and/or static features that are visible and/or detectable in images captured under low illumination level conditions. For example, a nighttime feature network may be trained. The term "nighttime feature" used herein relates generally to a feature that is visible and/or detectable in an image captured under low illumination level conditions and that is expected to not change significantly over a time period (e.g., days, weeks, months, a year, a few years, and/or the like). In an example embodiment, the nighttime feature network may be used to develop, generate, and/or update a library or database of nighttime feature information/data that can be used for real time or near real time accurate localization. For example, the nighttime feature network may be used to develop, generate, and/or update a nighttime feature map. In an example embodiment, a nighttime feature map comprises a dense full 3D point cloud, geo-tagged images, geo-tagged features, a high definition (HD) map and/or the like comprising and/or corresponding to nighttime features. In an example embodiment, the nighttime feature map may be used to perform vehicle localization and/or to determine pose information/data corresponding to a vehicle. In an example embodiment, the pose information/data corresponding to a vehicle may comprise be the location (e.g., a physical geo-location of the vehicle) and a heading (e.g., the direction in which the vehicle is facing).

In an example embodiment, the generated and/or extracted nighttime feature information/data may be used for real time or near real time localization of a vehicle (e.g., an autonomously driven vehicle, a vehicle operating with assisted driving, a manually driven vehicle, and/or the like) traveling under low illumination level conditions. In an example embodiment, the nighttime features may be invariant or static features that are expected to not change significantly over a time period (e.g., days, weeks, months, a year, a few years, and/or the like). For example, a nighttime feature may not change significantly with a change of seasons. In an example embodiment, a nighttime feature may be a feature that is detectable and/or identifiable in an image captured under low illumination level conditions. In an example embodiment, a nighttime feature may be a feature that is illuminated by headlights of the vehicle 5, that are light sources (e.g., street lamps, neon signs, and/or the like), features illuminated by non-headlight light sources, and/or the like. For example, nighttime features may be sources that are identifiable in an image captured at night.

Some non-limiting examples of invariant or static features are lane lines, road signs, street lamps, reflective surfaces, guard rails, mile markers, and/or the like. In an example embodiment, one or more nighttime features may not have semantic meaning. For example, a nighttime feature may be a reflective feature within the road surface and/or the like.

In certain example embodiments, the network may be trained by providing a set of sequences of training images to the network. For example, a sequence of training images may comprise a temporal sequence of three or more training images. For example, three or more images of similar scenes may be captured over a short time period. For example, an image capturing device onboard a vehicle may capture a sequence of training images as the vehicle travels along a short portion of a road segment. For example, in an example embodiment, the three or more training images of the sequence of training images are captured at a rate of 30 kHz. The three or more images comprising the sequence of training images may substantially overlap. For example, there may be a substantial overlap in the field of view shown in each of the three or more training images. For example, two images may be considered to substantially overlap if at least one static feature is present and/or identifiable in both images.

FIG. 1 provides an illustration of an example system that can be used in conjunction with various embodiments of the present invention. As shown in FIG. 1, the system may include one or more vehicle apparatuses 20, one or more remote apparatuses 10, one or more networks 50, and/or the like. In various embodiments, the vehicle apparatus 20 may be an in vehicle navigation system, vehicle control system, a mobile computing device, and/or the like. For example, a vehicle apparatus 20 may be an in vehicle routing and navigation system mounted within and/or be onboard a vehicle 5 such as a motor vehicle, non-motor vehicle, automobile, car, scooter, truck, van, bus, motorcycle, bicycle, Segway, golf cart, and/or the like. In various embodiments, the vehicle apparatus 20 may be a smartphone, tablet, personal digital assistant (PDA), and/or other mobile computing device. In another example, the vehicle apparatus 20 may be a vehicle control system configured to autonomously drive a vehicle 5, assist in control of a vehicle 5, and/or the like.

In an example embodiment, a remote apparatus 10 may comprise components similar to those shown in the example remote apparatus 10 diagrammed in FIG. 2A. In an example embodiment, the remote apparatus 10 may be configured to train a nighttime feature network and/or utilize a nighttime feature network to generate a nighttime feature map. In an example embodiment, the remote apparatus 10 is configured to provide map updates, corrected pose information/data, and/or the like to the vehicle apparatus 20. In an example embodiment, a vehicle apparatus 20 may comprise components similar to those shown in the example vehicle apparatus 20 diagrammed in FIG. 2B. In various embodiments, the remote apparatus 10 may be located remotely from the vehicle apparatus 20. Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), cellular network, and/or the like. In some embodiments, a network 40 may comprise the automotive cloud, digital transportation infrastructure (DTI), radio data system (RDS)/high definition (HD) radio or other digital radio system, and/or the like. For example, a vehicle apparatus 20 may be in communication with a remote apparatus 10 via the network 40. For example, the vehicle apparatus 20 may communicate with the remote apparatus 10 via a network, such as the Cloud. For example, the Cloud may be a computer network that provides shared computer processing resources and data to computers and other devices connected thereto. For example, the vehicle apparatus 20 may be configured to receive one or more map tiles of a digital map from the remote apparatus 10.

In an example embodiment, as shown in FIG. 2B, the vehicle apparatus 20 may comprise a processor 22, memory 24, a communications interface 26, a user interface 28, one or more location sensors 30 (e.g., a location sensor such as a GPS sensor; IMU sensors, and/or the like), one or more image capturing devices (e.g., camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras, 3D cameras, 360° cameras and/or the like) and/or other sensors that enable the vehicle apparatus 20 to determine one or more features of the corresponding vehicle's 5 surroundings, and/or other components configured to perform various operations, procedures, functions or the like described herein. In at least some example embodiments, the memory 24 is non-transitory and may store information/data corresponding to one or more parameters, features, and/or characteristics of the image capturing device 32. The memory 24 may further store information/data that identifies the correspondence between (a) the position of the vehicle 5 and the position of the location sensor 30, (b) the position of the location sensor 30 and the image capturing device 32, (c) the pose of the vehicle 5 and the field of view of the image capturing device 32, and/or the like. In an example embodiment, the vehicle apparatus may further comprise a nighttime feature network 34 that has been trained to identify one or more nighttime features within a captured image for developing, generating, updating, and/or the like a nighttime feature map and/or to assist in vehicle localization based on a nighttime feature map. The nighttime feature map may be used by a vehicle apparatus 20 to perform optical and/or image-based localization of the vehicle 5 under low illumination level conditions. For example, the nighttime feature network 34 may be trained to extract nighttime features and/or nighttime feature information/data from an image captured by the image capturing device 32 and geo-tag the extracted nighttime features and/or nighttime feature information/data based on pose information/data corresponding to the captured image (e.g., determined by the location sensor(s) 30). In an example embodiment, the nighttime feature network 34 may operate on a central processing unit (CPU) or a graphics processing unit (GPU) of the vehicle apparatus 20, remote apparatus 10, and/or the like.

Similarly, as shown in FIG. 2A, the remote apparatus 10 may comprise a processor 12, memory 14, a user interface 18, a communications interface 16, and/or other components configured to perform various operations, procedures, functions or the like described herein. Certain example embodiments of the vehicle apparatus 20 and the remote apparatus 10 are described in more detail below with respect to FIGS. 2A and 2B.

II. Example Operation

In an example embodiment, a deep net and/or neural network is trained to identify nighttime features within images and extract and/or generate nighttime feature information/data corresponding to the nighttime feature(s) present and/or identifiable within the images. The nighttime feature information/data may be stored in a library or database and/or stored in association with a digital map. For example, geo-tagged nighttime feature information/data may be stored as a layer of a digital map. For example, the remote apparatus 10 may store nighttime feature information/data as a layer of and/or in association with a map tile in which the corresponding nighttime feature is located. The map tile and/or nighttime feature information/data may then be provided to one or more vehicle apparatuses 20. The vehicle apparatuses 20 may use the nighttime feature information/data to perform localization and/or pose determination using various optical, image-based, and/or odometry techniques. In an example embodiment, the vehicle apparatuses 20 may use the nighttime feature information/data to perform localization and/or pose determination using techniques such as those described in co-pending U.S. patent application Ser. No. 15/375,513, filed Dec. 12, 2016, the contents of which are incorporated herein by reference.

Before the nighttime feature network 34 is used to extract and/or generate static feature information/data from captured images, the network is trained. In an example embodiment, the nighttime feature network 34 is a deep net and/or neural network trained using an unsupervised learning technique. For example, a sequence of training images may be received from one or more vehicle apparatuses 20. One or more sequences of images may be provided to the network to train the network. In an example embodiment, the sequence of training images {I} comprises images captured at time $t_{-n}, t_{-(n-1)}, \ldots, t_{-1}, t_0, t_1, \ldots, t_{n-1}, t_n$, wherein n is a natural number. For example, the sequence of training images {I} may comprise image $I_k$ captured at time $t_k$, wherein k is an integer with $-n \le k \le n$. In an example embodiment, a location sensor 30 may capture observed pose information/data at time $t_k$. The network may analyze the sequence of training images to identify features present in more than one of the images and to reconstruct at least a portion of one of the one or more images. For example, the network may analyze images $I_{-n}, I_{-(n-1)}, \ldots, I_{-1}, I_1, I_{n-1}, I_n$ to generate an encoded representation of at least a portion of image $I_0$. For example, the network may analyze images $I_{-n}, I_{-(n-1)}, \ldots, I_{-1}, I_1, I_{n-1}, I_n$ and identify at least one feature present in more than one of the analyzed images. The at least one feature may then be used to generate an encoded representation of the image $I_0$. The encoded representation of the image $I_0$ and the image $I_0$ may be analyzed to determine a loss function quantifying how well the encoded representation of the image $I_0$ encodes one or more nighttime features present in the image $I_0$. One or more network weights and/or parameters may then be updated based on the loss function, such that the nighttime feature network 34 may be trained.

In an example embodiment, after the nighttime feature network 34 is trained, the nighttime feature network may be used to develop, generate, and/or update a nighttime feature map. For example, one or more vehicle apparatuses may travel along one or more street segments under low illumination level conditions and capture images and corresponding pose information/data. An image may be provided to the nighttime feature network 34 to extract one or more nighttime features and/or nighttime feature information/data therefrom. The extracted nighttime features may be geo-tagged (e.g., determined based on the pose information/data corresponding to the image) and/or the nighttime feature information/data may comprise and/or be appended to comprise geo-location information/data (e.g., determined based on the pose information/data corresponding to the image) indicating the location of the corresponding nighttime feature. A nighttime feature map may then be developed, generated, and/or updated based at least in part on the extracted nighttime features and/or nighttime feature information/data. In an example embodiment, the nighttime feature information/data may be stored as an array. In an example embodiment, the array encoding the nighttime feature information/data may comprise information/data indicating the geometry, shape, size, texture, and/or the like of the nighttime feature. For example, the nighttime feature information/data (e.g., location and/or orientation information/data and/or three dimensional geometry information/data corresponding to a nighttime feature) may be determined through direct observation of the nighttime feature.

The nighttime feature map may then be provided. For example, a nighttime feature map may be provided as a layer in a map tile of digital map, and/or the like. For example, The nighttime feature information/data may be stored in a nighttime feature library or database. In an example embodiment, the nighttime feature information/data may be stored in association with and/or incorporated into a digital map. For example, a digital map may be tiled such that map information/data may be stored, received, provided, transmitted, and/or the like in a modular format (e.g., tile by tile). In various embodiments, the tiles may be defined by a set of parallel and perpendicular tile boundaries. For example, the tiles may be rectangular or square (e.g., 2 km by 2 km squares). In other embodiments, the tiles may be defined by boundaries which are curved, not parallel and/or perpendicular to one or more other boundaries, and/or the like. In various embodiments, the tiles may be a uniform tiling of the map. In other embodiments, the tiles may vary in size and/or shape based on the geography of the map region, the topology of the map region, population or feature density within the map region, and/or the like. For example, nighttime feature information/data corresponding to a nighttime feature may be stored in association with, linked to, and/or as a layer or the like of a map tile within which the nighttime feature is located. In an example embodiment, the nighttime feature information/data may be linked to a road segment within the digital map (and/or a tile there of) corresponding to the location of the nighttime feature. Thus, the nighttime feature information/data may be easily provided to one or more vehicle apparatuses 20 with a map update (e.g., one or more updated map tiles) and/or efficiently accessed by a vehicle apparatus 20 to perform real time or near real time localization and/or pose determination. In an example embodiment, the training of the nighttime feature network 34 may overlap with the development, generation, and/or updating of the nighttime feature map. For example, nighttime features identified during the training of the nighttime feature network may be used to develop, generate, and/or update at least a portion of a nighttime feature map.

A map tile comprising a nighttime feature map layer, and/or the like, may be received by a vehicle apparatus 20. The vehicle apparatus 20 may be traveling under low illumination level conditions. The vehicle apparatus 20 may capture a captured image (e.g., via the image capturing device 32) and observed pose information/data (e.g., by the location sensor 30). In an example embodiment, the captured image may be analyzed in light of the nighttime feature information/data of the nighttime feature map. For example, the nighttime feature network 34 and/or one or more layers thereof may be used to generate an encoded representation of the captured image and a map projection may be generated based on the observed pose information/data and the nighttime feature map. The encoded representation of the captured image and the map projection may be compared to generate and/or determine corrected pose information. Thus, localization of the vehicle 5 may be accomplished to a desired level of accuracy under low illumination conditions through use of the nighttime feature network 34.

Example embodiments provide an improvement to computer-related technology. Generally, optical and/or image-based localization techniques fail to provide accurate localization under low illumination level conditions. However, in an example embodiment, the nighttime feature network and/or the nighttime feature map may provide means for a vehicle apparatus 20 to accurately localize the vehicle 5 under low illumination level conditions. Thus, example embodiments improve the vehicle apparatus' 20 ability to perform autonomous driving, assisted driving, navigation, and/or the like of the vehicle 5 under low illumination level conditions. Various aspects of the present invention will now be described in more detail.

Training the Nighttime Feature Network

FIG. 3 provides a flowchart of processes and procedures that may be completed by the remote apparatus 10 (and/or one or more vehicle apparatuses 20) to train the nighttime feature network 34, according to an example embodiment. For example, training the nighttime feature network 34 may comprise determining one or more network weights and/or parameters used in the execution of various layers of a deep net and/or neural network. In an example embodiment, the one or more network weights and/or parameters may be determined using an unsupervised learning technique. For example, no manual coding of data may be performed or provided to the deep net and/or neural network.

Starting at block 102, one or more sequences of training images are received and/or accessed. For example, the remote apparatus 10 may receive and/or access one or more sequences of training images. For example, the remote apparatus 10 may comprise means, such as the processor 12, memory 14, communications interface 16, user interface 18, and/or the like, for receiving and/or accessing one or more sequences of training images. For example, the remote apparatus 10 may receive one or more sequences of training images from one or more vehicle apparatuses 20. For example, an image capturing device 32 of a vehicle apparatus 20 onboard a vehicle 5 may capture one or more images under low illumination conditions (e.g., at night). The vehicle 5 may comprise headlights that illuminate at least a part of the field of view of the image capturing device 32 and therefore may illuminate a nighttime feature within the field of view of the image capturing device. The image capturing device 32 may therefore capture a sequence of training images comprising nighttime features and the vehicle apparatus 20 may provide the sequence of training images to the remote apparatus 10, in an example embodiment. In an example embodiment, a sequence of training images is a temporal sequence of training images. For example, the sequence of training images $\{I\}$ comprises images $I_{-n}, I_{-(n-1)}, \ldots, I_{-1}, I_0, I_1, I_{n-1}$ captured at times $t_{-n}, t_{-(n-1)}, \ldots, t_{-1}, t_0, t_1, \ldots, t_{n-1}$, respectively. For example, $t_k < t_{k+1}$, thus the sequence of training images $\{I\}$ may be a temporal sequence of training images. In an example embodiment, the sequence of training images $\{I\}$ comprises three or more images. In an example embodiment, the images of the sequence of training images substantially overlap. In an example embodiment, the images of the sequence(s) of training images $\{I\}$ were captured under low illumination level conditions. For example, the images of the sequence(s) of training images $\{I\}$ may be have been captured at night, under heavy cloud cover, and/or the like.

In an example embodiment, a sequence of pose information/data corresponding to the sequence of training images may also be received and/or accessed. For example, the remote apparatus 10 (e.g., via the processor 12, memory 14, communications interface 16, user interface 18, and/or the like) may receive and/or access a sequence of pose information/data corresponding to the sequence of training images. For example, training image $I_k$ of the sequence of training images $\{I\}$ may be captured at time $t_k$ by an image capturing device 32 of a vehicle apparatus 20 onboard a vehicle 5. One or more location sensors 30 of the vehicle apparatus 20 onboard the vehicle 5 may determine pose information/data for the vehicle apparatus 20 and/or the vehicle 5 at time $t_k$. For example, the vehicle apparatus 20 may comprise a real time clock and may cause the image capturing device 32 to capture an image and the location sensor(s) 30 to determine pose information/data in parallel, sequentially, and/or approximately simultaneously such that the image is captured and the pose information/data is determined in real or near real time with respect to one another. In another example, the vehicle apparatus 20 may use the processor cycles to cause the image capturing device 32 to capture an image and the location sensor(s) 30 to determine pose information/data in parallel, sequentially, and/or approximately simultaneously such that the image is captured and the pose information/data is determined in real or near real time with respect to one another. In an example embodiment, the real time clock and/or processor cycles may be used to capture images and determine pose information/data at a configurable and/or predetermined frequency (e.g., 30 kHz and/or the like).

In an example embodiment, pose information/data comprises a location (e.g., latitude and longitude) and/or a heading. For example, the pose information/data may comprise a location described by geospatial coordinates (e.g., latitude and longitude, and/or the like) that represent the current physical location of the vehicle 5 and/or the vehicle apparatus 20 on board the vehicle 5 at approximately the moment the captured image is captured. In an example embodiment, the pose information/data may comprise a heading describing the direction the vehicle 5 is currently facing and/or heading with respect to a reference direction at approximately the moment the captured image is captured. For example, the pose information/data may comprise the angle between a reference direction (e.g., North and/or the like) and the direction in which the front of the vehicle 5 is directed at approximately the moment when the corresponding image is captured. Thus, in an example embodiment a sequence of pose information/data {P}, wherein pose information/data $P_k$ of the sequence of pose information/data {P} corresponds to the pose of the vehicle 5 and/or the corresponding vehicle apparatus 20 at approximately the moment when the image $I_k$ of the sequence of training images {I} was captured by the image capturing device 32 of the vehicle apparatus 20.

At block 104, one or more sequences of training images {I} are provided to a deep net and/or neural network to train the nighttime feature network. For example, the remote apparatus 10 may provide one or more sequences of training images {I} to a deep net and/or neural network to train the nighttime feature network. For example, the remote apparatus 10 may comprise means, such as the processor 12 and/or the like, for providing the one or more sequences of training images {I} to deep net and/or neural network to train the nighttime feature network. In an example embodiment, the sequence of pose information/data {P} corresponding to the sequence of training images {I} is provided to the deep net and/or neural network along with the sequence of training images {I}. Thus, in an example embodiment, the deep net and/or neural network may receive one or more sequences of training images {I}, corresponding sequences of pose information/data {P}, and/or the like. In an example embodiment, the deep net and/or neural network is represented as an auto-encoder network. In an example embodiment, the deep net and/or neural network operates on the processor 12 and/or the processor 12 comprises a node the network.

At block 106, the deep net and/or neural network analyzes at least a portion of a sequence of training images {I} to identify one or more nighttime features present in two or more of the training images. Nighttime feature information/data corresponding to the identified one or more nighttime features may then be extracted from the images of the sequence of training images {I}. In an example embodiment, the deep net and/or neural network analyzes a portion of the training images of the sequence of training images. For example, the deep net and/or neural network may be configured to generate a encoded representation of a particular image of the sequence of training images based on analyzing the other images of the sequence. For example, the deep net and/or neural network may analyze the images of the sequence of training images other than $I_k$ to determine one or more nighttime features that are expected to be present in image $I_k$. In an example embodiment, the sequence of training images {I} is temporally ordered. For example, image $I_k$ is captured at time $t_k$ and $t_k < t_{k+1}$. In an example embodiment, the sequence of training images {I} is temporally ordered and the deep net and/or neural network analyzes the images of the sequence of training images other than $I_0$ to determine one or more nighttime features that are expected to be present in image $I_0$. In an example embodiment, the image $I_0$ is the middle image of the sequence of training images {I}. For example, the sequence of training images {I} comprises images $I_{-n}$, $I_{-(n-1)}$, . . . , $I_{-1}$, $I_0$, $I_1$, . . . , $I_{n-1}$, $I_n$.

To identify a nighttime feature by analyzing the sequence of training images {I} and/or a portion thereof, the deep net and/or neural network determines if a feature that is visible in one of the training images $I_k$ is also present in at least one other training image $I_m$. In an example embodiment, it may be determined if the position of the feature in training image $I_m$ can be predicted based on the position of the feature in training image $I_k$ and the sequence of pose information/data {P}. For example, if the change in the pose of the vehicle 5 and/or the vehicle apparatus 20 describes the change in the position of a feature from training image $I_k$ to training image $I_m$, then the change in the position of the feature between the images is due to the movement of the vehicle 5 and not due to the movement of the feature itself. Thus, the feature may be a stable or static feature and may be identified as a nighttime feature. For example, a lane line, reflective surface embedded in the road surface, street lamp, lights on a building, traffic sign, and/or the like are static and/or stable features and any movement of such features between images is due to the movement of the vehicle 5. In another example, the headlights and/or taillights of another vehicle on the road will move in a way that is not described by the change in pose of the vehicle 5. For example, the other vehicle on the road is also moving and therefore the change in pose of the vehicle 5 alone is insufficient to describe the change in position of the headlights of another vehicle between a first image and a second image. As should be understood, the deep net and/or neural network and/or layers thereof may use various techniques to identify one or more nighttime features (e.g., stable and/or static features that are visible and/or detectable in an image captured under low illumination level conditions) in the sequence of training images {I} and/or at least a portion thereof. Thus, in an example embodiment, the motion of unstable features (e.g., other vehicles, pedestrians, etc.) throughout the sequence of training images {I} causes the identification of unstable features as nighttime features to be suppressed through the training of the network. In an example embodiment, structure from motion techniques may be used to reconstruct the features of a particular image in the sequence of training images.

In an example embodiment, the deep net and/or neural network and/or layers thereof may extract nighttime feature information/data corresponding to the identified nighttime features. In an example embodiment, nighttime feature information/data may comprise an array describing the size, three dimensional shape, location, orientation, and/or the like of the nighttime feature. In an example embodiment, the nighttime features are ground truth features. For example, the location, orientation, and/or three dimensional geometry information/data corresponding to a nighttime feature may be determined through direct observation. In an example embodiment, the nighttime feature information/data, and/or a portion thereof, may be determined by comparing the appearance of the identified nighttime feature in multiple training images (e.g., by one or more layers of the deep net and/or neural network operating on the processor 12 and/or the like).

At block 108, the identified nighttime features and/or the extracted nighttime feature information/data is used to generate an encoded representation of one of the images of the sequence of training images $\{I\}$. For example, an encoded representation of image $I_k$ of the sequence of training images $\{I\}$ may be generated. In an example embodiment, the sequence of training images $\{I\}$ with the image $I_k$ removed is analyzed to identify nighttime features and/or extract nighttime feature information/data. For example, the images $I_{-n}, \ldots, I_{k-1}, I_{k+1}, I_n$ may be analyzed to identify nighttime features and/or extract nighttime feature information/data that is then used to generate the encoded representation of image $I_k$. In an example embodiment, the sequence of training images is temporally ordered and the encoded representation of image $I_0$, the middle image in the sequence of training images $\{I\}$, is generated. In an example embodiment, the encoded representation of an image is an image that comprises a representation of the nighttime features expected to be present in the image based on the analysis of the sequence of training images $\{I\}$ and/or a portion thereof. For example, the remote apparatus 10 may generate an encoded representation of one of the images of the sequence of training images $\{I\}$, for example, based on the nighttime feature information/data extracted from the sequence of training images $\{I\}$ and/or a portion thereof. For example, the remote apparatus 10 may comprise means, such as the processor 12 and/or the like, for generating an encoded representation of one of the images of the sequence of training images $\{I\}$, for example, based on the nighttime feature information/data extracted from the sequence of training images $\{I\}$ and/or a portion thereof. In an example embodiment, a patch-based representation of the reconstructed image is associated with a geo-tagged nighttime feature.

At block 110, the encoded representation of one of the images of the sequence of training images $\{I\}$ and the corresponding image are analyzed, compared, and/or the like. For example, the encoded representation of image $I_k$ and the image $I_k$ may be analyzed, compared, and/or the like to determine how well the encoded representation of image $I_k$ provides a representation of image $I_k$. For example, if the encoded representation of image $I_0$ was generated, the encoded representation of $I_0$ and the image $I_0$ are analyzed, compared, and/or the like. For example, the remote apparatus 10 may analyze, compare, and/or the like the encoded representation of the image $I_k$ (e.g., the encoded representation of image $I_0$) and the image $I_k$ (e.g., image $I_0$ which is the middle image in the temporally ordered set of training images $\{I\}$). For example, the remote apparatus 10 may comprise means, such as the processor 12 and/or the like, for analyzing, comparing, and/or the like the encoded representation of the image $I_k$ (e.g., the encoded representation of image $I_0$) and the image $I_k$ (e.g., image $I_0$ which is the middle image in the temporally ordered set of training images $\{I\}$).

At block 112, a loss function is determined, computed, generated, and/or the like based on the analysis, comparison and/or the like of the image $I_k$ and the encoded representation of the image $I_k$. For example, the remote apparatus 10 may determine, compute, generate and/or the like a loss function. For example, the remote apparatus 10 may comprise means, such as the processor 12 and/or the like, for determining, computing, generating, and/or the like a loss function. In an example embodiment, a loss function may be determined, computed, generated, and/or the like based on and/or to quantify the analysis of the alignment of one or more features present in the encoded representation of the image $I_k$ and the corresponding feature in the image $I_k$. For example, a function quantifying the alignment of one or more features present in the image $I_k$ with the corresponding feature in the encoded representation of the image $I_k$ may be evaluated, calculated, and/or the like based on the analysis of the image $I_k$ and the encoded representation of the image $I_k$ to provide a loss function. In an example embodiment, a cross-entropy based loss function is determined, calculated, and/or generated.

At block 114, one or more network weights and/or parameters are updated, modified, and/or the like based on the analysis, comparison and/or the like of the image $I_k$ and the encoded representation of the image $I_k$. For example, the remote apparatus 10 may update, modify, and/or the like one or more network weights and/or parameters based on the analysis, comparison and/or the like of the image $I_k$ and the encoded representation of the image $I_k$. For example, the remote apparatus 10 may comprise means, such as the processor 12, memory 14, and/or the like, for updating, modifying, and/or the like one or more network weights and/or parameters based on the analysis, comparison and/or the like of the image $I_k$ and the encoded representation of the image $I_k$. For example, the one or more network weights and/or parameters may be updated to minimize one or more loss functions and/or the like. In an example embodiment, the one or more network weights and/or parameters may be updated using a stochastic gradient descent technique. In an example embodiment, the one or more network weights and/or parameters may be updated using a stochastic gradient descent technique using momentum, in which previous iterations of the network weights and/or parameters are remembered and the updates, modifications, and/or the like to the network weights and/or parameters are determined based at least in part on at least one previous iteration of the network weights and/or parameters. It should be understood that various techniques to update, modify, and/or the like the network weights and/or parameters to, for example, minimize the loss function may be utilized. In an example embodiment, two or more sequences of training images $\{I\}$ may be analyzed before the network weights and/or parameters are updated and/or modified. For example, a set of loss functions wherein each loss function corresponds to a sequence of training images $\{I\}$ may be determined and analyzed to update, modify, and/or the like the network weights and/or parameters.

In one example embodiment, assuming that the nighttime features present in the encoded representation of image $I_k$ and the corresponding nighttime features in the image $I_k$ are indexed by some common parameter i, one example loss function is loss=$\Sigma_i d_\Theta(f_i, f_i')$, where $f_i$ refers to the features from the encoded representation of image $I_k$, $f_i'$ refers to the features from the image $I_k$, and $d_\Theta$ is a function that quantifies the alignment of the corresponding features. In an example embodiment, the alignment between corresponding features may comprise a distance between the position of the features in the corresponding image and the encoded representation thereof, and/or an angular alignment of the features in the corresponding image and the encoded representation thereof. In an example embodiment, the loss function is reduced and/or minimized as the features in the encoded representation of the image $I_k$ are better aligned with the corresponding features in the image $I_k$. Thus, the loss function may be used to encourage the nighttime feature network to provide a more accurate encoded representation of the image $I_k$ based on the analysis of the sequence of training images {I} and/or a portion thereof and may suppress the identification of non-stable and/or non-static features as nighttime features. For example, the loss function may be used to encourage the nighttime feature network to identify features that are visible under low illumination level conditions and that are stable across the time period when the sequence of training images {I} was captured and provide accurate nighttime feature information/data based on the analyzed images.

At block 116, it may be determined if the one or more network weights and/or parameters have converged sufficiently to satisfy a convergence threshold requirement. In an example, if an update, modification, and/or the like to the one or more network weights and/or parameters is sufficiently small for one or more iterations, the convergence of the network weights and/or parameters may have converged sufficiently to satisfy a convergence threshold requirement. For example, the remote apparatus 10 may determine if the convergence of the one or more network weights and/or parameters is sufficient to satisfy a convergence threshold requirement. For example, the remote apparatus 10 may comprise means, such as the processor 12 and/or the like, for determining if the convergence of the one or more network weights and/or parameters is sufficient to satisfy a convergence threshold requirement.

If, at block 116, it is determined that the convergence of the one or more network weights and/or parameters is not sufficient to satisfy the convergence threshold requirement, the process may return to blocks 102 and/or 104 to receive and/or access one or more additional sequences of training images {I} and/or to provide one or more sequences of training images {I} to the deep net and/or neural network to further train the nighttime feature network (e.g., to further refine, determine, modify, and/or update one or more network weights and/or parameters).

If, at block 116, it is determined that the convergence of the one or more network weights and/or parameters is sufficient to satisfy the convergence threshold requirement, the process may continue to block 118. At block 118, the nighttime feature network may be locked (e.g., the network weights and/or parameters may be fixed at their current values and not updated and/or modified further). The nighttime feature network may then be used to develop, generate, and/or update one or more nighttime feature maps, as described in more detail below. In an example embodiment, the one or more network weights and/or parameters may be provided (e.g., transmitted) to one or more vehicle apparatuses 20. For example by the remote apparatus 10 (e.g., using the communications interface 16) may provide the one or more network weights and/or parameters and one or more vehicle apparatuses 20 may receive (e.g., via the communications interface 26) the one or more network weights and/or parameters. A vehicle apparatus 20 may receive and store the one or more network weights and/or parameters such that the vehicle apparatus 20 may operate nighttime feature network 34 (e.g., via the processor 22 and/or the like). For example, the nighttime feature network 34 may use the one or more received network weights and/or parameters and operate on the processor 22 to extract, generate, determine and/or the like nighttime feature information/data corresponding to one or more nighttime features identified in one or more images captured under low illumination level conditions. In an example embodiment, the remote apparatus 10 may continue to train the nighttime feature network to further refine one or more network weights and/or parameters and may provide updated network weights and/or parameters to one or more vehicle apparatuses 20 regularly, periodically, as the updated network weights and/or parameters provide a non-negligible difference in the extracted, generated, determined nighttime feature information/data, the identified nighttime features, and/or the like.

As should be understood, in an example embodiment, a similar technique of providing a sequence of training images {I} captured under other illumination conditions (e.g., daytime illumination level conditions, and/or the like), a stable feature network may be trained. Such a stable feature network may be used to build a stable feature map that may then be provided as part of a digital map (e.g., as a layer of a digital map tile). The stable feature map may then be provided to one or more vehicle apparatuses 20 and used to perform vehicle localization.

Building a Nighttime Feature Map

FIG. 4 is a flowchart illustrating processes and procedures that may be completed by the remote apparatus 10 (and/or vehicle apparatus 20) to build, generate, create, and/or update a nighttime feature map using the nighttime feature network to identify nighttime features and extract nighttime feature information/data from images. In an example embodiment, a nighttime feature map may be library, database, repository, and/or the like of nighttime feature information/data extracted from images by a nighttime feature network. In an example embodiment, a nighttime feature map and/or a portion thereof may be stored in association and/or as a part of (e.g., as a layer of) a digital map and/or digital map tile. Starting at block 202, an image is captured under low illumination level conditions and the corresponding pose information/data is determined. For example, a vehicle apparatus 20 may capture an image under low illumination level conditions and determine the corresponding pose information/data. For example the vehicle apparatus 20 may comprise means, such as the image capturing device 32, processor 22, memory 24, and/or the like for capturing an image under low illumination level conditions. The vehicle apparatus 20 may further comprise means, such as the location sensor 30 and/or the like, for determining pose information/data corresponding to the image. For example, the vehicle apparatus 20 may comprise a real time clock and may cause the image capturing device 32 to capture an image and the location sensor(s) 30 to determine pose information/data in parallel, sequentially, and/or approximately simultaneously such that the image is captured and the pose information/data is determined in real or near real time with respect to one another. In another example, the vehicle apparatus 20 may use the processor cycles to cause the image capturing device 32 to capture an image and the location sensor(s) 30 to determine pose information/data in parallel, sequentially, and/or approximately simultaneously such that the image is captured and the pose information/data is determined in real or near real time with respect to one another. In an example embodiment, pose information/data comprises a location (e.g., latitude and longitude) and/or a heading. For example, the pose information/data may comprise a location described by geospatial coordinates (e.g., latitude and longitude, and/or the like) that represent the current physical location of the vehicle 5 and/or the vehicle apparatus 20 on board the vehicle 5 at approximately the moment the captured image is captured. In an example embodiment, the pose information/data may comprise a heading describing the direction the vehicle 5 is currently facing and/or heading with respect to a reference direction at approximately the moment the captured image is captured. For example, the pose information/data may comprise the angle between a reference direction (e.g., North and/or the like) and the direction in which the front of the vehicle 5 is directed at approximately the moment when the corresponding image is captured. In an example embodiment, the vehicle 5 may comprise headlights that illuminate at least a part of the field of view of the image capturing device 32 and therefore may illuminate a nighttime feature within the field of view of the image capturing device. For example, in an example embodiment, a nighttime feature is an invariant, static, and/or stable feature that is identifiable in an image captured at night. For example, in an example embodiment, a nighttime feature may be a feature that is illuminated by the headlights of the vehicle 5, is a light source (e.g., street lamps, neon signs, and/or the like), is illuminated by non-headlight light sources, and/or the like.

In an example embodiment, the nighttime feature network operates on the remote apparatus 10 and/or another apparatus, for example, in a Cloud computing architecture. Thus, in an example embodiment, the vehicle apparatus 20 may provide (e.g., transmit) the image and the corresponding pose information/data. For example, the vehicle apparatus 20 may comprise means, such as the processor 22, communications interface 26, and/or the like, for providing the image and the corresponding pose information/data. The remote apparatus 10, or another apparatus, may receive the image and the corresponding pose information/data. For example, the remote apparatus 10 may comprise means, such as the processor 12, communications interface 16, and/or the like, for receiving the image and the corresponding pose information/data. In one example embodiment, the nighttime feature network 34 operates on the vehicle apparatus 20 and the vehicle apparatus 20 may not provide (e.g., transmit) the image and/or the corresponding pose information/data.

At block 204, the image and the corresponding pose information/data is provided to the nighttime feature network. For example, the vehicle apparatus 20 may provide the image and the corresponding pose information/data to the nighttime feature network 34. For example, the vehicle apparatus 20 may comprise means, such as the processor 22 and/or the like, for providing the image and the corresponding pose information/data to the nighttime feature network 34. For example, the remote apparatus 10 and/or another apparatus may provide the image and the corresponding pose information/data to the nighttime feature network. For example, the remote apparatus 10 may comprise means, such as the processor 12 and/or the like, for providing the image and the corresponding pose information/data to the nighttime feature network.

At block 206, the nighttime feature network analyzes the image to identify one or more nighttime features in the image. For example, the nighttime feature network may apply the one or more network weights and/or parameters determined during the training of the nighttime feature network and analyze the image based there on. For example, the nighttime feature network operating on the vehicle apparatus 20, remote apparatus 10, and/or another apparatus, may be analyze the image to identify one or more nighttime features in the image. For example, the vehicle apparatus 20, remote apparatus 10, and/or another apparatus may comprise means, such as processor 22, processor 12, and/or the like, for operating the nighttime feature network to identify one or more nighttime features in the image. In an example embodiment, the nighttime feature network 34 may extract nighttime feature information/data corresponding to the nighttime feature(s) identified in the image. For example, the nighttime feature network 34 may extract nighttime feature information/data from the image.

At block 208, the identified nighttime features are geo-tagged based on the pose information/data corresponding to the analyzed image. For example, the nighttime feature network operating on the vehicle apparatus 20, remote apparatus 10, and/or other apparatus may geo-tag the identified nighttime features. For example, the vehicle apparatus 20, remote apparatus 10, and/or other apparatus may comprise means, such as processor 22, processor 12, and/or the like to geo-tag the identified nighttime features. In an example embodiment, geo-tagging a nighttime feature comprises analyzing the pose information/data corresponding to the image and the position of the nighttime feature in the image to determine feature pose information/data. For example, the feature pose information/data may comprise a position (e.g., a geo-location, latitude and longitude, and/or the like) corresponding to the physical location of the nighttime feature. In an example embodiment, the feature pose information/data may comprise information/data indicating an orientation of the nighttime feature. The feature pose information/data may then be appended to, added to, and/or stored as part of the nighttime feature information/data. For example, the nighttime feature information/data may be stored in an array, XML, and/or other form of data architecture. Thus, the nighttime feature may be geo-tagged by associating and/or storing feature pose information/data for the nighttime feature with the corresponding nighttime feature information/data.

At block 210, the geo-tagged nighttime features are provided. For example, the nighttime feature network 34 may provide the geo-tagged nighttime features (e.g., the nighttime feature information/data comprising the feature pose information/data) as output. In an example embodiment, if the nighttime feature network 34 is operating on the vehicle apparatus 20 and/or another apparatus, the geo-tagged nighttime features (e.g., the nighttime feature information/data comprising the feature pose information/data) may be provided (e.g., transmitted) to the remote apparatus 10. For example, the vehicle apparatus 20 may comprise means, such as the processor 22, the communications interface 26, and/or the like, for providing the nighttime feature information/data, including the feature pose information/data, to the remote apparatus 10. For example, the remote apparatus 10 may receive (e.g., at the processor 12 via the communications interface 16) the nighttime feature information/data.

At block 212, the nighttime feature information/data may be used to develop, generate, and/or update a nighttime feature map. In an example embodiment, the nighttime feature map is stored in association with, linked to, stored as a layer of, and/or the like a map tile. For example, the remote apparatus 10 may link nighttime feature information/data corresponding to a nighttime feature located within Map Tile A and along Road Segment B with Map Tile A and/or with Road Segment B in the nighttime feature map. For example, the nighttime feature map may be stored as a layer of the digital map tile. For example, the apparatus 10 may comprise means, such as processor 12, memory 14, and/or the like, for developing, generating, and/or updating a nighttime feature map. For example the nighttime feature map may be developed, generated, and/or updated by linking nighttime feature information/data corresponding to a nighttime feature to a map tile and/or road segment corresponding to the location of the corresponding nighttime feature within a nighttime feature map that is a layer of a digital map. For example, Map Tile A may be packaged to include the nighttime feature map as a layer of the map tile, the nighttime feature map comprising the nighttime feature information/data corresponding to one or more nighttime features that are located within Map Tile A.

At block 214, the nighttime feature map is provided. For example, the remote apparatus 10 provide (e.g., transmit) the nighttime feature map. For example, the remote apparatus 10 may comprise means, such as the processor 12, communications interface 16, and/or the like for providing the nighttime feature map. For example, one or more vehicle apparatuses 20 may receive the nighttime feature map. For example, one or more vehicle apparatuses 20 may comprise means, such as processor 22, memory 24, communications interface 26, and/or the like for receiving and storing a nighttime feature map. In an example embodiment, a map tile comprising the nighttime feature information/data, for example within a layer of the map tile, may be provided through communications network 40 to one or more vehicle apparatus 20. The vehicle apparatuses 20 may then use at least a portion of the nighttime feature information/data to perform localization and/or pose determination using optical and/or image-based techniques under low illumination level conditions. In an example embodiment, a vehicle apparatus 20 may use at least a portion of the nighttime feature information/data to perform localization and/or pose determination to enable autonomous and/or assisted driving of a vehicle 5 that the vehicle apparatus 20 is onboard under low illumination level conditions.

Performing Image-Based Localization Under Low Illumination Level Conditions

FIG. 5 is a flowchart illustrating processes and procedures that may be completed by the vehicle apparatus 20 to perform localization of a vehicle 5 under low illumination level conditions in one example embodiment. Starting at block 302, a map tile comprising a nighttime feature map is received. For example, the nighttime feature map may be a layer of the map portion provided by the map tile. For example, the vehicle apparatus 20 may receive and store a map tile comprising a nighttime feature map. For example, the vehicle apparatus 20 may comprise means, such as the processor 22, communications interface 26, memory 24, and/or the like, for receiving and storing a map tile comprising a nighttime feature map. For example, the map tile may comprise a nighttime feature map as a layer thereof. The nighttime feature map comprises nighttime feature information/data corresponding to one or more nighttime features. In an example embodiment, nighttime features are stable and/or static features that are visible under low illumination level conditions.

At block 304, an image is captured under low illumination level conditions. For example, the vehicle apparatus 20 may capture an image under low illumination level conditions. For example, the vehicle apparatus 20 may comprise means, such as an image capturing device 32, processor 22, memory 24, and/or the like, for capturing an image under low illumination level conditions. For example, the vehicle 5 may be traveling along a road segment and the vehicle apparatus 20 may be autonomously driving the vehicle 5, assisting the driving of the vehicle 5, navigating, and/or the like under low illumination level conditions. The vehicle apparatus 20 may perform an optical and/or image-based localization technique to determine the pose of the vehicle 5. Thus, the vehicle apparatus 20 may capture an image under low illumination level conditions. In an example embodiment, the vehicle 5 may comprise headlights that illuminate at least a part of the field of view of the image capturing device 32 and therefore may illuminate a nighttime feature within the field of view of the image capturing device. For example, in an example embodiment, a nighttime feature is an invariant, static, and/or stable feature that is identifiable in an image captured at night. For example, in an example embodiment, a nighttime feature may be a feature that is illuminated by the headlights of the vehicle 5, is a light source (e.g., street lamps, neon signs, and/or the like), is illuminated by non-headlight light sources, and/or the like.

At block 306, observed pose information/data may be determined. For example, in an example embodiment, the vehicle apparatus 20 may determine observed pose information/data. For example, the vehicle apparatus 20 may comprise means, such as location sensor(s) 30, processor 22, memory 24, and/or the like for determining observed pose information/data. In an example embodiment, the location sensor(s) 30 may comprise one or more IMUs that are used to determine a current pose for the vehicle 5 based on a change in pose indicated by measurements made by the IMUs and a previous pose of the vehicle 5. In an example embodiment, the location sensor(s) 30 may comprise a GNSS and/or GPS sensor that may determine the pose of the vehicle 5 to within a particular accuracy. The particular accuracy, however, may not meet the localization accuracy of around 10 cm that the industry recognizes is desired for autonomous driving in many areas. Thus, observed pose information/data may be determined for the vehicle 5.

At block 308, the captured image may be analyzed to identify one or more image features within the image. In an example embodiment, an image feature is a nighttime feature present in the image. For example, the vehicle apparatus 20 may analyze the captured image to identify one or more image features therein. For example, the vehicle apparatus 20 may comprise means, such as the processor 22, nighttime feature network 34, and/or the like, for analyzing the image to identify one or more image features therein. For example, the nighttime feature network 34 and/or one or more layers thereof may be used to identify one or more image features in the image, generate an encoded representation of the image comprising one or more image features identified in the image, and/or the like. For example, the nighttime feature network 34 and/or one or more layers thereof may be used as a nighttime feature detector configured to identify image features within the image and generate an encoded representation of the image.

At block 310, one or more nighttime features that are expected to be present in the image are identified based on the nighttime feature map and the observed pose information/data. For example, the vehicle apparatus 20 may identify one or more nighttime features that are expected to be present in the image based on the nighttime feature map and the observed pose information/data. For example, the vehicle apparatus 20 may comprise means, such as the processor 22, memory 24, and/or the like, for identifying one or more nighttime features that are expected to be present in the image based on the nighttime feature map and the observed pose information/data. For example, a map projection comprising the one or more nighttime features expected to be present in the image based on the nighttime feature map and the observed pose information/data may be generated.

At block 312, corrected pose information/data may be determined. For example, the corrected pose information/data may describe the pose for the vehicle 5 within a desired accuracy level. For example, the corrected pose information/data may describe the pose of the vehicle 5 within a 10 cm accuracy. For example, the vehicle apparatus 20 may determine corrected pose information/data. For example, the vehicle apparatus 20 may comprise means, such as the processor 22, communications interface 26, and/or the like, for determining corrected pose information/data. For example, the map projection comprising one or more nighttime features expected to be present in the image may be compared to an encoded representation of the image to determine the corrected pose information/data. For example, in an example embodiment, the map projection and the encoded representation of the image may be provided to a trained deep net and/or neural network configured to determine corrected pose information/data based on analyzing and/or comparing the map projection and the encoded representation of the image. For example, a missregistration and/or relative pose difference between the map projection and the encoded representation of the image may be analyzed and used to determine corrected pose information/data. In an example embodiment, the correction is determined based on the result of the comparison and/or alignment of the map projection and the encoded representation of the image. For example, a pose correction applied to the observed pose information/data to determine the corrected pose information/data may be equal in magnitude to the missregistration and/or relative pose difference between one or more nighttime features in the map projection and one or more corresponding image features in the encoded representation of the image.

Once the corrected pose information/data is determined, the corrected location and/or heading of the vehicle 5 may then be provided through an output device of the vehicle apparatus 20 (e.g., a display of the user interface 28, and/or the like), communicated to another computing entity (e.g., the remote apparatus 10), and/or used as input to one or more processes executed by the vehicle apparatus 20 that require an accurate determination of the vehicle 5 and/or vehicle apparatus's 20 location and/or pose. For example, the corrected pose information/data may be used as input to one or more processes used to autonomously drive the vehicle 5 and/or assist in driving the vehicle 5 (e.g., route planning and/or the like). For example, the vehicle apparatus 20 may make one or more route planning decisions and/or operate the vehicle 5 in accordance therewith based on the corrected pose information/data. Thus, the result of a localization determination may be the corrected pose information/data which may then be used by the vehicle apparatus 20 to perform route planning decisions and/or to operate the vehicle 5 in accordance therewith.

Thus, an accurate, real time (or near real time) determination of the pose (e.g., location and/or heading) of the vehicle 5 and/or vehicle apparatus 20 may be determined. In an example embodiment, the location of the vehicle 5 and/or vehicle apparatus 20 on board the vehicle 5 may be determined to within a predefined positional accuracy, such as an accuracy of 10 cm, under low illumination level conditions. Thus, in an example embodiment, the location and/or pose of the vehicle 5 and/or vehicle apparatus 20 may be determined with an accuracy that enables and/or facilitates autonomous operation of the vehicle 5 under low illumination level conditions.

III. Example Apparatus

The vehicle apparatus 20 and/or remote apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the vehicle apparatus 20 and/or remote apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. For example, in an example embodiment, the vehicle apparatus 20 is an in vehicle routing and navigation system on board a vehicle 5 and the remote apparatus 10 is a map provider system that is remotely located with respect to the vehicle apparatus 20.

In this regard, FIG. 2A depicts a remote apparatus 10 and FIG. 2B depicts a vehicle apparatus 20 of an example embodiment that may be embodied by various computing devices including those identified above. As shown, the remote apparatus 10 of an example embodiment may include, may be associated with or may otherwise be in communication with a processor 12 and a memory device 14 and optionally a communication interface 16 and/or a user interface 18. Similarly, a vehicle apparatus 20 of an example embodiment may include, may be associated with, or may otherwise be in communication with a processor 22, and a memory device 24, and optionally a communication interface 26, a user interface 28, one or more location sensors 30 (e.g., a location sensor such as a GPS sensor; IMU sensors, and/or the like), one or more image capturing devices (e.g., camera(s); 2D and/or 3D LiDAR(s); long, medium, and/or short range RADAR; ultrasonic sensors; electromagnetic sensors; (near-)IR cameras, 3D cameras, 360° cameras and/or the like) and/or other sensors that enable the vehicle apparatus to determine one or more features of the corresponding vehicle's surroundings, and/or other components configured to perform various operations, procedures, functions or the like described herein. In an example embodiment, the vehicle apparatus 20 may further comprise a nighttime feature network 34. For example, the nighttime feature network may be a trained deep net and/or neural network. For example, network weights and/or parameters for the nighttime feature network 34 may be provided (e.g., transmitted) to the vehicle apparatus 20 by the remote apparatus 10.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the remote apparatus 10 and/or vehicle apparatus 20 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the remote apparatus 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The remote apparatus 10 and/or the vehicle apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the remote apparatus 10 and/or vehicle apparatus 20 of an example embodiment, a routing and navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In an example embodiment, the data records (e.g., node data records, link data records, POI data records, and/or other data records) may comprise computer-executable instructions, a reference to a function repository that comprises computer-executable instructions, one or more coefficients and/or parameters to be used in accordance with an algorithm for performing the analysis, one or more response criteria for providing a response indicating a result of the analysis, and/or the like. In at least some example embodiments, the vehicle apparatus 20 may be configured to execute computer-executable instructions provided by and/or referred to by a data record. In an example embodiment, the remote apparatus 10 may be configured to modify, update, and/or the like one or more data records of the geographic database.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be updated based on information/data provided by one or more vehicle apparatuses. For example, the remote apparatus 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a routing and navigation system that embodies a vehicle apparatus 20 in accordance with an example embodiment may determine the time to traverse a route that includes one or more turns at respective intersections more accurately.

IV. Apparatus, Methods, and Computer Program Products

As described above, FIGS. 3, 4, and 5 illustrate flowcharts of apparatuses 10, 20, method, and computer program product according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A map provider system configured for providing a feature map for vehicle localization under low illumination level conditions, the map provider system comprising:
    at least one memory, the at least one memory storing a digital map;
    at least one communications interface configured to enable communication with one or more routing and navigation systems;
    at least one processor configured to:
        operate a trained deep neural network, the trained deep neural network configured to:
            receive an image captured under low illumination level conditions and pose data corresponding to the image;
            identify a feature within the image;
            analyze the image to extract feature information corresponding to the feature from the image;
            determine, based on the image and the pose data, geo-location information corresponding to the feature; and
            append the geo-location information to the feature information; and
        store the feature information as part of a feature map layer of the digital map; and
        cause the at least one communications interface to provide at least a portion of the digital map to a routing and navigation system, wherein the routing and navigation system is configured to (a) perform a localization determination based on the feature map layer of the portion of the digital map and (b) make a routing decision based on the localization determination.

2. A map provider system according to claim 1, wherein, to train the deep neural network, the at least one processor is configured to:
    cause the deep neural network to receive a sequence of training images, the sequence of training images captured under particular conditions;
    analyze, by the deep neural network, a portion of the sequence of training images, the sequence of training images comprising a particular training image and the portion of the sequence of training images comprising two or more training images of the sequence of training images that are not the particular training image;
    identify, by the deep neural network, one or more features based on the analysis of the portion of sequence of training images;
    generate, by the deep neural network, an encoded representation of the particular training image;
    determine a loss function based on an analysis of the particular training image and the encoded representation of the particular training image; and
    update a network weight of the deep neural network based at least in part on the loss function.

3. A map provider system according to claim 2, wherein the deep neural network is formatted as an auto-encoder representation.

4. A map provider system according to claim 2, wherein the sequence of training images is a temporal sequence and the particular training image is a middle image of the temporal sequence.

5. A map provider system according to claim 2, wherein (a) a sequence of pose information is provided to the deep neural network, (b) each instance of the sequence of pose information corresponds to a training image of the sequence of training images, and (c) the one or more features are identified based at least in part on motion indicated by the sequence of pose information.

6. A map provider system according to claim 1, wherein the image is captured at nighttime.

7. A method comprising:
    receiving, by a trained deep neural network, an image captured under low illumination level conditions and pose data corresponding to the image;
    identifying, by the trained deep neural network, a feature within the image;
    analyzing the image with the trained deep neural network to extract feature information corresponding to the feature from the image;
    determining, by the trained deep neural network and based on the image and the pose data, geo-location information corresponding to the feature;
    appending, by the deep neural network, the geo-location information to the feature information;
    storing the feature information as part of a feature map layer of a digital map; and
    providing at least a portion of the digital map to a routing and navigation system.

8. A method according to claim 7, wherein training the deep neural network comprises:
    receiving, by the deep neural network, a sequence of training images, the sequence of training images captured under particular conditions;
    analyzing, by the deep neural network, a portion of the sequence of training images, the sequence of training images comprising a particular training image and the portion of the sequence of training images comprising two or more training images of the sequence of training images that are not the particular training image;

identifying, by the deep neural network, one or more features based on the analysis of the portion of sequence of training images;

generating, by the deep neural network, an encoded representation of the particular training image;

determining a loss function based on an analysis of the particular training image and the encoded representation of the particular training image; and updating a network weight of the deep neural network based at least in part on the loss function.

9. A method according to claim 8, wherein the deep neural network is formatted as an auto-encoder representation.

10. A method according to claim 8, wherein the sequence of training images is a temporal sequence and the particular training image is a middle image of the temporal sequence.

11. A method according to claim 8, wherein (a) a sequence of pose information is provided to the deep neural network, (b) each instance of the sequence of pose information corresponds to a training image of the sequence of training images, and (c) the one or more features are identified based at least in part on motion indicated by the sequence of pose information.

12. A method according to claim 7, wherein the routing and navigation system performs one or more localization determinations based on information stored in the feature map layer and at least one of (a) performs one or more route planning decisions, (b) operates a vehicle based on the one or more localization determinations, or (c) both.

13. A method according to claim 7, wherein the image is captured at nighttime.

14. A computer program product comprising at least one non-transitory computer-readable storage medium having computer-executable program code instructions stored therein, the computer-executable program code instructions comprising program code instructions configured to:

operate a trained deep neural network to:
receive an image captured under low illumination level conditions and pose data corresponding to the image;
identify a feature within the image;
analyze the image to extract feature information corresponding to the feature from the image;
determine, based on the image and the pose data, geo-location information corresponding to the feature; and
append the geo-location information to the feature information;
store the feature information as part of a feature map layer of a digital map; and
provide at least a portion of the digital map to a routing and navigation system.

15. A computer program product according to claim 14, the computer-executable program code instructions comprising program code instructions configured to train the deep neural network by:

receiving, by the deep neural network, a sequence of training images, the sequence of training images captured under particular conditions;

analyzing, by the deep neural network, a portion of the sequence of training images, the sequence of training images comprising a particular training image and the portion of the sequence of training images comprising two or more training images of the sequence of training images that are not the particular training image;

identifying, by the deep neural network, one or more features based on the analysis of the portion of sequence of training images;

generating, by the deep neural network, an encoded representation of the particular training image;

determining a loss function based on an analysis of the particular training image and the encoded representation of the particular training image; and updating a network weight of the deep neural network based at least in part on the loss function.

16. A computer program product according to claim 15, wherein the deep neural network is formatted as an auto-encoder representation.

17. A computer program product according to claim 15, wherein the sequence of training images is a temporal sequence and the particular training image is a middle image of the temporal sequence.

18. A computer program product according to claim 15, wherein (a) a sequence of pose information is provided to the deep neural network, (b) each instance of the sequence of pose information corresponds to a training image of the sequence of training images, and (c) the one or more features are identified based at least in part on motion indicated by the sequence of pose information.

19. A computer program product according to claim 14, wherein the routing and navigation system performs one or more localization determinations based on information stored in the feature map layer and at least one of (a) performs one or more route planning decisions, (b) operates a vehicle based on the one or more localization determinations, or (c) both.

20. A computer program product according to claim 14, wherein the image is captured at nighttime.

* * * * *